United States Patent [19]

Oh

[11] Patent Number: 5,604,648
[45] Date of Patent: Feb. 18, 1997

[54] CIRCUIT AND METHOD FOR CONTROLLING SPEED AND PHASE OF VCR SERVO SYSTEM

[75] Inventor: Young G. Oh, Seoul, Rep. of Korea

[73] Assignee: Goldstar Co., Ltd., Seoul, Rep. of Korea

[21] Appl. No.: 422,611

[22] Filed: Apr. 13, 1995

Related U.S. Application Data

[63] Continuation of Ser. No. 81,883, Jun. 25, 1993, abandoned.

[30] Foreign Application Priority Data

Jun. 26, 1992 [KR] Rep. of Korea .................. 11225/1992

[51] Int. Cl.⁶ .................................................. G11B 15/46
[52] U.S. Cl. ...................... 360/73.11; 360/70; 360/73.07; 360/73.13
[58] Field of Search ..................................... 360/70, 73.06, 360/73.07, 73.11, 73.12, 73.13, 38.1

[56] References Cited

U.S. PATENT DOCUMENTS

| | | | |
|---|---|---|---|
| 4,672,474 | 6/1987 | Rodal | 360/70 |
| 4,737,868 | 4/1988 | Kimura et al. | 360/72.1 X |
| 5,019,923 | 5/1991 | Ogaki | 360/73.07 |
| 5,270,884 | 12/1993 | Kim | 360/73.12 |
| 5,274,514 | 12/1993 | Han | 360/73.13 |

FOREIGN PATENT DOCUMENTS

| | | | |
|---|---|---|---|
| 58-182151 | 10/1983 | Japan | 360/73.11 |
| 61-1179 | 1/1986 | Japan | 360/73.07 |

*Primary Examiner*—Aristotelis Psitos
*Assistant Examiner*—James T. Wilson
*Attorney, Agent, or Firm*—Finnegan, Henderson, Farabow, Garrett & Dunner, L.L.P.

[57] ABSTRACT

A circuit for controlling a speed and a phase of a VCR servo system includes a Control (CTL) signal generation section, a speed error detection section, a phase error detection section and a speed/phase control section. The phase error detection section has a recording phase error detector and a playback phase error detector. A CTL signal blank discrimination section inputs a CTL pulse from the playback phase error detector, discriminates a blank interval of a CTL signal based on the inputted CTL pulse, and outputs discrimination signal in accordance with the discriminated result. A first switching control section inputs the discrimination signal, an FF/REW mode signal, a recording mode signal and a tape type discriminating signal and performs a logical operation based on the inputted signals to output a first control signal. A second switching control section inputs a video tape loading signal, the FF/REW mode signal and the tape type discriminating signal and performs a logical operation based on the inputted signals to output a second control signal. A first switching section is operative in response to the first control signal and a second switching section is operative in response to the second control signal.

8 Claims, 10 Drawing Sheets

FIG. 4a PRIOR ART   CFG SIGNAL

FIG. 4b PRIOR ART   CFG PULSE

FIG. 4c PRIOR ART   CONVERTER OUTPUT 1  2  3  4   — ncfg — Scfg — SPEED ERROR — ncfg

FIG. 4d   FREQUENCY - DIVIDER OUTPUT / REFERENCE PHASE PULSE OUTPUT

FIG. 4e   PREF     PREF

FIG. 4f   SUBCONTRACTER OUTPUT

PHASE ERROR

FIG. 4g PRIOR ART   CTL SIGNAL

FIG. 4h PRIOR ART   CTL PULSE

CIRCUIT AND METHOD FOR CONTROLLING SPEED AND PHASE OF VCR SERVO SYSTEM

This application is a continuation of application Ser. No. 08/081,883, filed Jun. 25, 1993, now abandoned.

BACKGROUND OF THE INVENTION

1. Field of the Invention

The present invention relates in general to a servo system which constitutes a tape travelling system in a video cassette recorder (VCR) deck mechanism, and more particularly to a circuit and a method for controlling a speed and a phase of the servo system constantly using a capstan frequency generation (CFG) pulse in a blank interval of a control (CTL) pulse when a video tape is winding.

2. Description of the Prior Art

Figure 1:
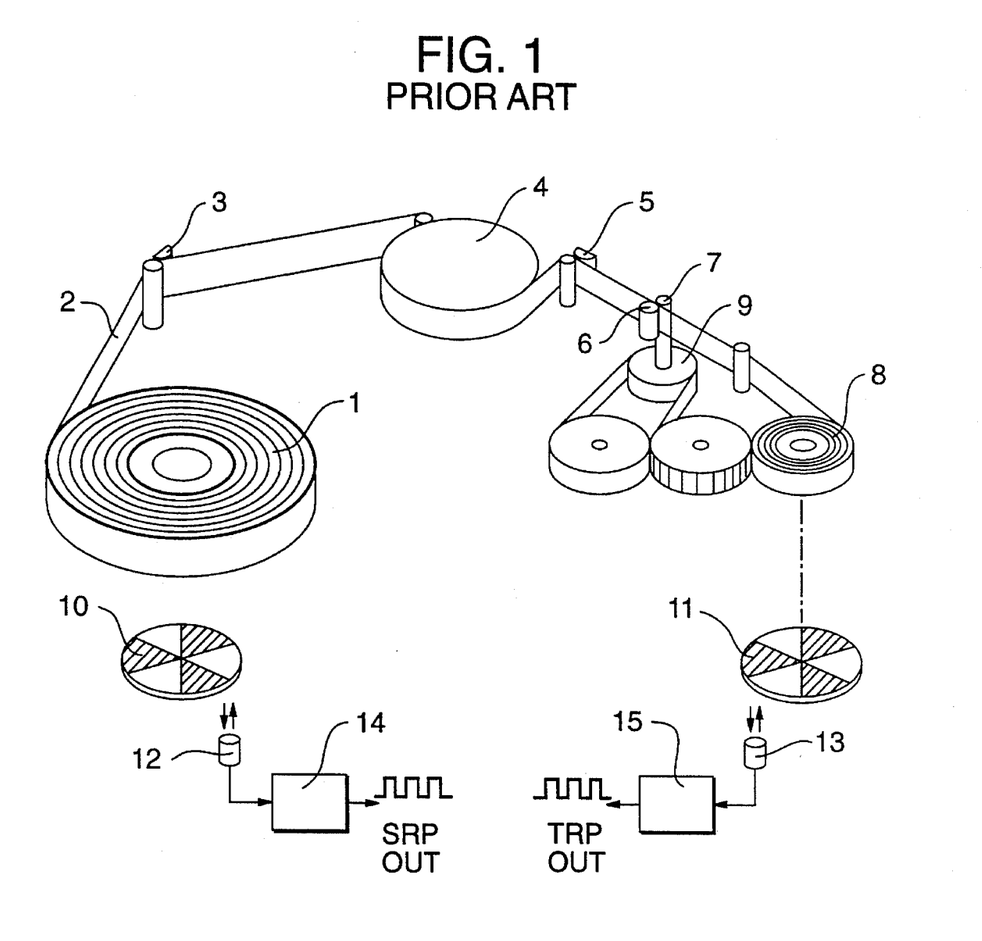
FIG. 1 is a view illustrating schematically a general tape travelling system in a VHS type of VCR deck mechanism.

Referring to FIG. 1, there is schematically shown a general tape travelling system in a VHS type of VCR deck mechanism.

During operation, a video tape 2 supplied from a supply reel 1 is passed in a recording mode through a full erase head 3, with information previously recorded therein being erased. Then, the video tape 2 is passed through a drum 4, with a video signal being recorded or played back thereon/therefrom.

A control (CTL) pulse is recorded or reproduced on/from a control track of the video tape 2 by a recording/playback control head 5. Finally, the video tape 2, through the control head 5, is pressed between a pinch roller 6 and a capstan shaft 7 and then wound about a take-up reel 8 by the pressure.

For the purpose of transferring the video tape in the VHS type of VCR servo system, a speed and a phase of the servo system must be controlled. The speed control is performed based on an amount of rotations of a capstan motor 9 and the phase control is performed based on the CTL pulse reproduced from the control track of the video tape.

The capstan shaft 7 must be controlled constantly by the capstan motor 9 to ensure that the video tape is stably wound. The constant speed travelling of the video tape is directly connected to a picture quality in recording and playing back of the video signal, and results in an accurate determination of the remaining amount of the video tape required in reserve-recording the video signal. The remaining amount of the video tape is basic information in controlling a tape winding speed in FF/REW modes. For this reason, the constant speed travelling of the video tape must be controlled accurately.

A circuit for discriminating the remaining amount of the video tape comprises reflection plates 10 and 11 mounted to the supply reel 1 and the take-up reel 8, respectively. The reflection plates 10 and 11 rotate with the supply reel 1 and the take-up reel 8, respectively, and each has a plurality of bright and dark portions (for example, 8 or 16 equal parts) partitioned in a fixed angle. Also in the circuit, photocouplers 12 and 13 are provided to generate pulses corresponding to reflected light regulated by the reflection plates 10 and 11, respectively, in the during the winding of the video tape. Wave-shapers 14 and 15 are also provided to wave-shape the pulses from the photocouplers 12 and 13, respectively.

In a method of discriminating the remaining amount of the video tape with the above-mentioned construction, the reflection plates 10 and 11 rotate as the supply and take-up reels 1 and 8 rotate while the video tape is winding. As the reflection plates 10 and 11 rotate, the reflected light is regulated by the bright and dark portions of the reflection plates 10 and 11. Then, the photocouplers 12 and 13 generate the pulses corresponding to the reflected light regulated by the reflection plates 10 and 11, respectively. The wave-shapers 14 and 15 wave-shape the pulses from the photocouplers 12 and 13, respectively, and apply the wave-shaped pulses to an operation circuit (not shown). The operation circuit is adapted to measure a period of the rotation of each reel by counting the pulses and discriminate the type of the video tape and obtain the remaining amount thereof by calculating an angular velocity of each reel, a diameter of each hub and an area of the video tape wound about each reel based on the measured rotation period.

In calculating the remaining amount of the video tape, linear velocity, integral calculus and angular velocity are determined. The type of the video tape includes, for example, T-20, T-40, T-60, T-80, T-120, T-160 or T-180. The video tapes of the T-20 type to T-60 type have the same thickness and in this case the sizes of the hubs are the same. The video tapes of the T-80 type and T-120 type have the same thickness as that of the T-20 type, however in this case, the hubs have the same size as those of the hubs in the video tapes of the T-160 type and the T-180 type, respectively. Also, the video tapes of the T-160 type and the T-180 type have different thicknesses. Since the video tapes of various types have different thicknesses and the sizes of the hubs are different for the tapes mentioned above, there is a necessity for discriminating the type of the video tape being presently used and calculating the remaining amount thereof based on an equation.

As mentioned above, the period of the rotation of the reel is used in discriminating the type of the video tape and calculating the remaining amount thereof, and an accuracy in the measurement of the rotation period plays an important part in the calculation of the remaining amount of the video tape. That is, the reserve-recording of the video signal may be performed in a treble speed mode in the case where the amount of the video tape is not enough when the video signal is reserve-recorded on the video tape at a standard speed. Also, in the FF/REW modes, the middle portion of the video tape is wound at the highest speed allowable by the deck mechanism and the initial and end portions thereof are wound at a lower speed, resulting in prevention of the deck mechanism and the video tape from being damaged at the initial and end portions of the video tape.

Figure 2:
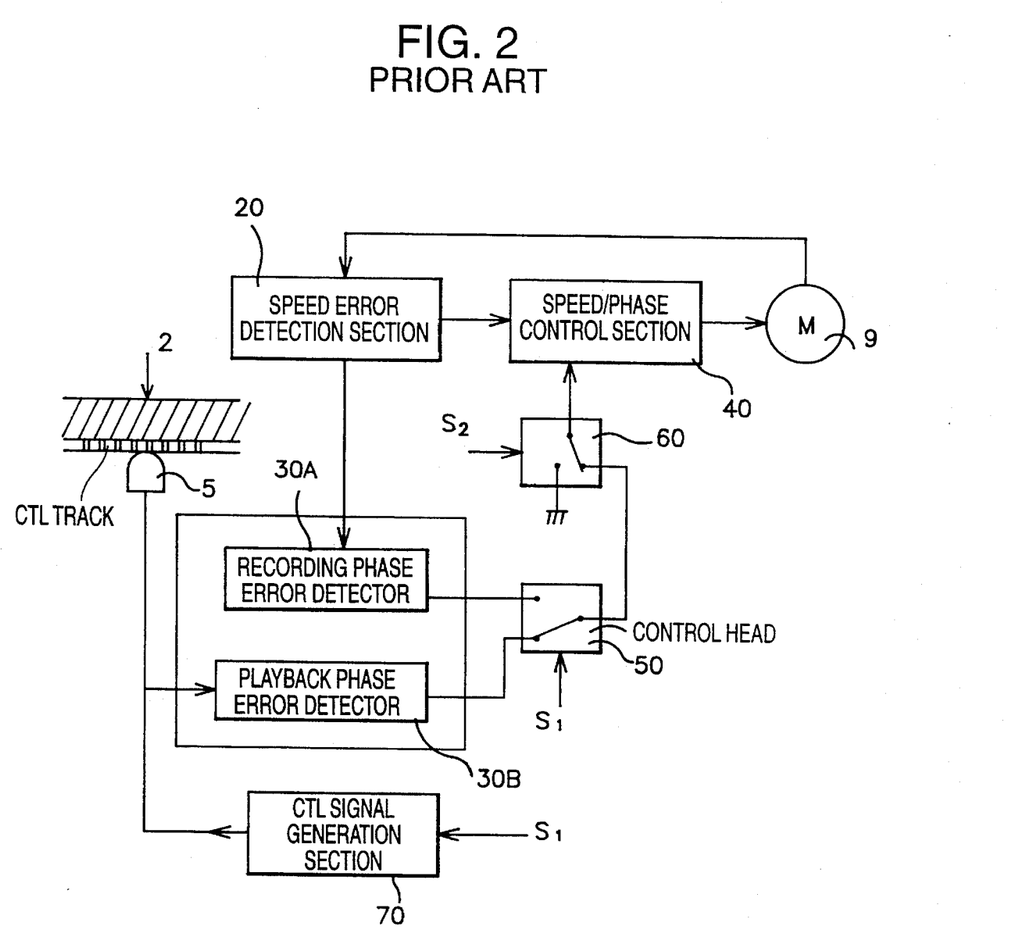
FIG. 2 is a schematic block diagram of a conventional circuit for controlling a speed and a phase of a VCR servo system.

Referring to FIG. 2, there is shown a schematic block diagram of a conventional circuit for controlling the speed and the phase of the VCR servo system using the control pulse. As shown in this drawing, the conventional control circuit comprises a CTL signal generation section 70 for generating the control signal to be recorded on the control track of the video tape, upon inputting a recording mode signal S1, a speed error detection section 20 for detecting a capstan frequency generation (CFG) signal from the capstan motor 9 during the travelling of the video tape to detect a speed difference between the CFG signal and a reference speed signal Sref from a speedometer and outputting the detected speed difference as speed control data, and a phase error detection section 30 having a recording phase error detector 30A and a playback phase error detector 30B.

The recording phase error detector 30A is adapted to detect a recording phase error from a CFG pulse from the capstan motor 9 in a recording mode and output the detected recording phase error as phase control data. The playback phase error detector 30B is adapted to detect a playback phase error from the CTL pulse recorded on the control track of the video tape in a playback mode and output the detected playback phase error as phase control data.

The conventional control circuit also comprises a speed/phase control section 40 and first and second switching sections 50 and 60.

The speed/phase control section 40 is adapted to input the speed control data from the speed error detection section 20 and the phase control data from the phase error detection section 30 the speed/phase control section 40 controls the speed and phase of the capstan motor 9 in accordance with the inputted data.

The first switching section 50 is operative in response to the recording mode signal S1 to select the output from the playback phase error detector 30B in the phase error detection section 30 in the playback mode and select the output from the recording phase error detector 30A in the recording mode.

The second switching section 60 is operative in response to an FF/REW mode signal S2 to apply no phase control data selected by the first switching section 50 to the speed/phase control section 40 in the FF/REW modes and apply the phase control data selected by the first switching section 50 to the speed/phase control section 40 in modes other than the FF/REW modes.

Figure 3:
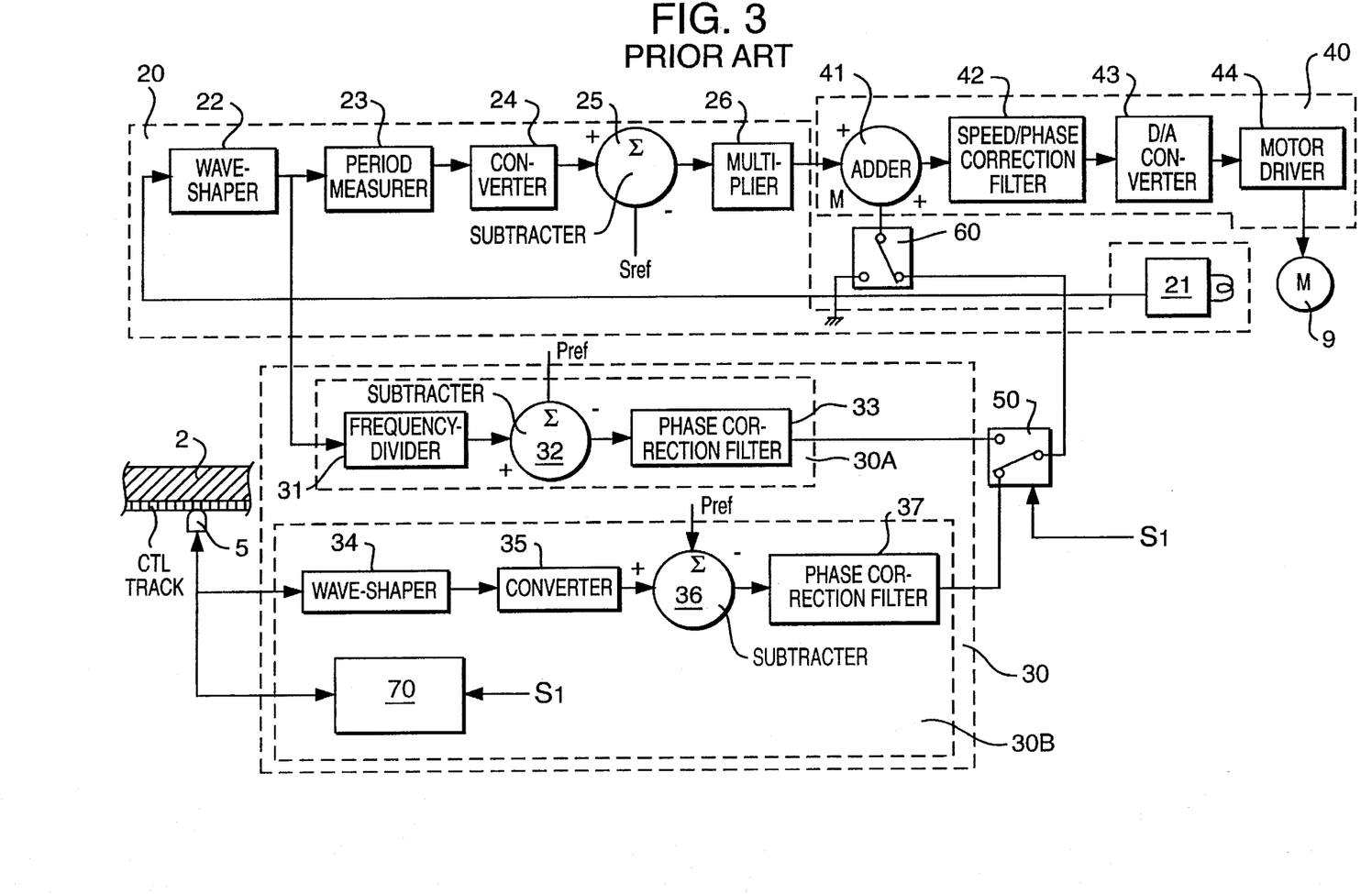
FIG. 3 is a detailed block diagram of the conventional control circuit in FIG. 2.

Referring to FIG. 3, there is shown a detailed block diagram of the conventional control circuit in FIG. 2. As shown in this figure, the speed error detection section 20 includes a CFG detector 21 for successively detecting the CFG signals from the capstan motor 9, a wave-shaper 22 for wave-shaping the detected CFG signals from the CFG detector 21 into the CFG pulses in the form of a square wave, a period measurer 23 for sequentially measuring a period of each CFG pulse from the wave-shaper 22, a converter 24 for converting the period value from the period measurer 23 into a time value, a subtracter 25 for subtracting the reference speed value Sref from the speedometer from an output signal from the converter 24 and outputting the resultant difference as a speed error signal, and a multiplier 26 for multiplying the speed error signal from the subtracter 25 by a predetermined integral number from the speedometer and outputting the resultant value as the speed control data.

As mentioned above, the phase error detection section 30 is provided with the recording phase error detector 30A for detecting the phase error of the video tape in the recording mode and the playback phase error detector 30B for detecting the phase error of the video tape in the playback mode.

The recording phase error detector 30A includes a frequency-divider 31 for frequency-dividing the CFG pulse from the wave-shaper 22 in the speed error detection section 20 by a predetermined frequency-dividing ratio (1/m), a subtracter 32 for subtracting a reference phase Pref from a phase of the CFG pulse frequency-divided by the frequency-divider 31 and outputting the resultant value as the recording phase error signal, and a phase correction filter 33 for inputting the recording phase error signal from the subtracter 32 and outputting the inputted signal as the phase control data to perform a phase correction of the video tape in the recording mode.

The playback phase error detector 30B includes a wave-shaper 34 for inputting through the control head 5 the CTL signal, which is generated from the CTL signal generation section 70 in the recording mode and then recorded on the control track of the video tape, and wave-shaping the inputted CTL signal into the CTL pulse in the form of a square wave, a converter 35 for converting a period of the CTL pulse from the wave-shaper 34 into a time value, a subtracter 36 for subtracting the reference phase signal Pref from an output signal of the converter 35 and outputting the resultant difference as the playback phase error signal, and a phase correction filter 37 for inputting the playback phase error signal from the subtracter 36 and outputting the inputted signal as the phase control data to perform a phase correction of the video tape in the playback mode.

The speed/phase control section 40 includes an adder 41 for adding the speed control data from the multiplier 26 in the speed error detection section 20 to the phase control data through the first and second switching sections 50 and 60 from the phase error detection section 30, a speed/phase correction filter 42 for outputting speed/phase correction data in accordance with an output signal from the adder 41, a digital/analog converter 43 for converting the speed/phase correction data from the speed/phase correction filter 42 into an analog signal, and a motor driver 44 for driving the capstan motor 9 in response to the analog signal from the digital/analog converter 43 to vary an amount of the rotation thereof.

The operation of the conventional speed/phase control circuit with the above-mentioned construction will hereinafter be described with reference to FIGS. 4A to 4G.

Figure 4A:
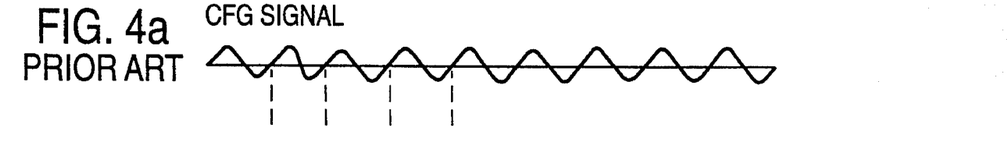
FIGS. 4A to 4H are waveform diagrams of signals from components in FIG. 3.

In the speed error detection section 20, the CFG detector 21, during the travelling (recording and playback) of the video tape, detects the rotation of the capstan motor 9 from N/S magnetic poles of a magnet mounted in the capstan motor 9 and then outputs successively the CFG signals as shown in FIG. 4A.

Figure 4B:
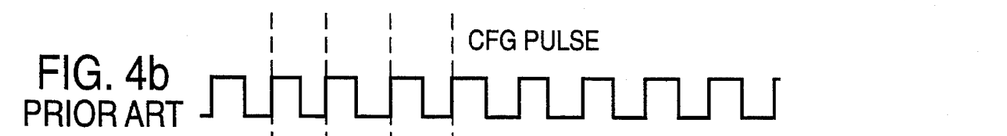

The detected CFG signals from the CFG detector 21 are applied to the wave-shaper 22, which wave-shapes the CFG signals in the form of square wave to output the CFG pulses as shown in FIG. 4B.

The period measurer 23 measures the period of each of the CFG pulses from the wave-shaper 22. Namely, the period measurer 23 measures the period of the first inputted one ("1" in FIG. 4B) of the CFG pulses as shown in FIG. 4B and then the period of the second inputted one ("2" in FIG. 4B) of the CFG pulses. In this manner, the period measurer 23 measures sequentially the period of each of the CFG pulses from the wave-shaper 22.

Figure 4C:
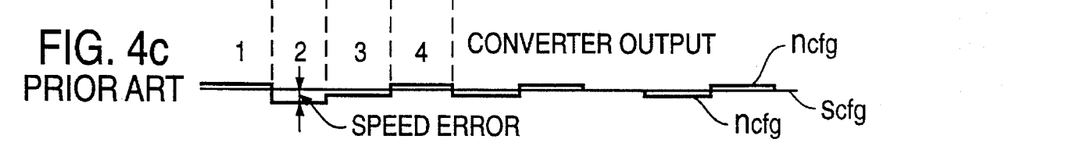

The period value obtained by the period measurer 23 is applied to the converter 24, which converts the period value into the time value as shown in FIG. 4C. Namely, as shown in FIG. 4C, when the period of the CFG pulse obtained by the period measurer 23 is long, the time value of the converter 24 is large. In terms of hardware, the period measurer 23 may be a counter. Provided that a clock period of the counter is Tck, the output of the converter 24 can be expressed as 1/Tck.

The subtracter 25 subtracts the reference speed signal Sref from the speedometer from the output signal $n_{CFG}$ from the converter 24 and outputs the resultant difference as the speed error signal as shown in FIG. 4C. The speed error signal from the subtracter 25 is multiplied by the predetermined integral number KO from the speedometer by the multiplier 26, which outputs the resultant value as the speed control data.

On the other hand, the CTL signal generation section 70 generates the CTL signal in response to the recording mode signal S1. The CTL signal from the CTL signal generation section 70 is recorded on the control track of the video tape by the recording/playback control head 5.

Figures 4D, 4E:
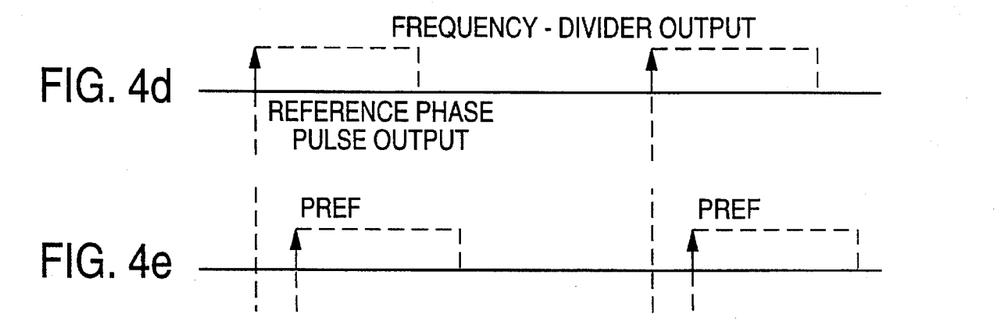
Figure 4F:
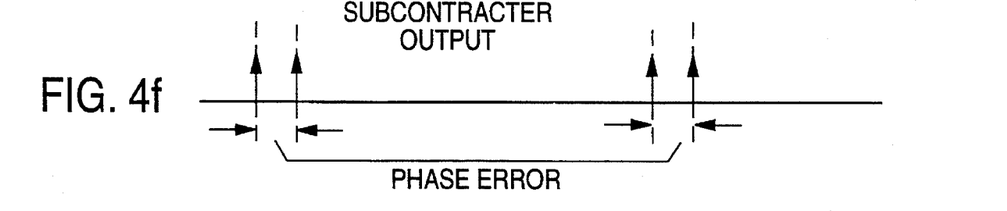

In the phase error detection section 30, in the recording mode, the frequency-divider 31 frequency-divides the CFG pulse from the wave-shaper 22 in the speed error detection section 20 by the predetermined frequency-dividing ratio (1/m) as shown in FIG. 4D. The subtracter 32 subtracts the reference phase signal Pref as shown in FIG. 4E, from the CFG pulse frequency-divided by the frequency-divider 31 and outputs the resultant value as the recording phase error signal as shown in FIG. 4F. The recording phase error signal from the subtracter 32 is filtered by the phase correction filter 33 and then outputted as the phase control data.

Figure 4G:
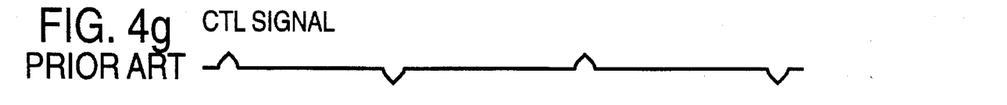
Figure 4H:
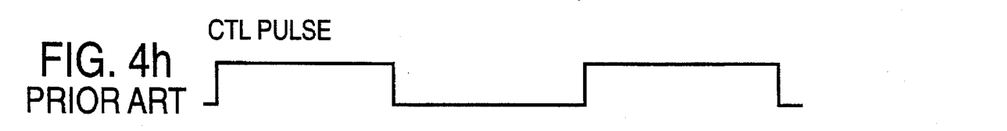

In the playback mode, the recording/playback control head 5 reproduces the CTL signal which is generated from the CTL signal generation section 70 in the recording mode and then recorded on the control track of the video tape, as shown in FIG. 4G, and then applies the reproduced CTL signal to the wave-shaper 34. The wave-shaper 34 wave-shapes the inputted CTL signal into the CTL pulse in the form of square wave as shown in FIG. 4H and then applies the CTL pulse to the converter 35, which converts the period of the CTL pulse into the time value. The subtracter 36 subtracts the reference phase signal Pref from the output signal from the converter 35 and outputs the resultant difference as the playback phase error signal. The playback phase error signal from the subtracter 36 is filtered by the phase correction filter 37 and then outputted as the phase control data.

The speed/phase control section 40 is adapted to input the speed control data from the speed error detection section 20 and the phase control data from the phase error detection section 30 and control the speed and phase of the capstan motor 9 in accordance with the inputted data.

In the playback mode, the first switching section 50 selects the output of the playback phase error detector 30B in the phase error detection section 30 in response to the recording mode signal S1. The second switching section 60 applies the output of the playback phase error detector 30B selected by the first switching section 50 to the speed/phase control section 40 because the present mode is not the FF/REW mode. As a result, in the speed/phase control section 40, the adder 41 adds the speed control data from the multiplier in the speed error detection section 20 to the phase control data through the first and second switching sections 50 and 60 from the playback phase error detector 30B in the phase error detection section 30. The output of the adder 41 is filtered by the speed/phase correction filter 42 and then outputted as the speed/phase correction data for the capstan motor 9. The digital/analog converter 43 converts the speed/phase correction data from the speed/phase correction filter 42 into the analog signal and then applies the analog signal to the motor driver 44, which drives the capstan motor 9 in response to the analog signal from the digital/analog converter 43 to vary the amount of the rotation thereof.

In the recording mode, the first switching section 50 selects the output of the recording phase error detector 30A in the phase error detection section 30 in response to the recording mode signal S1. The second switching section 60 applies the output of the playback phase error detector 30A selected by the first switching section 50 to the speed/phase control section 40. Therefore, the speed/phase control section 40 controls the speed and phase of the capstan motor 9 in accordance with the inputted data in a similar manner to that in the playback mode.

On the other hand, in the FF/REW modes, the second switching section 60 is not connected to the output of the phase error detection section 30, but to the ground. For this reason, the adder 41 in the speed/phase control section 40 is applied with only the speed control data from the speed error detection section 20 with no application of the phase control data (i.e., ≈0). As a result, in the FF/REW modes, only the speed of the capstan motor 9 is controlled by the speed/phase control section 40.

However, the conventional VCR speed/phase control circuit has a disadvantage in that the phase error data cannot accurately be detected in a blank interval of the CTL pulse. The inaccurate detection of the phase error data results in an unstable travelling speed of the video tape and the an error occurs in determining the remaining amount of the video tape. Also, it is difficult to discriminate the type of the multiple speed-recorded video tape in the FF/REW modes.

Figure 5:
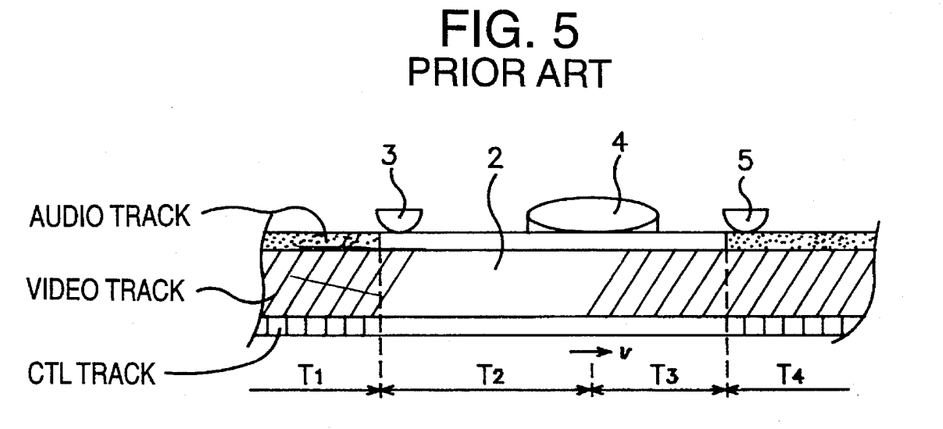
FIG. 5 is a view illustrating a positional relationship of the tape travelling system in the case where a video signal is recorded on a video tape by the conventional control circuit in FIG. 3.

FIG. 5 is a view illustrating a positional relationship of the tape travelling system in the case where a different video signal is to be recorded on the video tape under the condition that video, audio and control signals have previously been recorded on corresponding tracks of the video tape.

As the video tape 2 winds the direction as shown by the arrow in FIG. 5, the full erase head 3, the drum 4 and the recording/playback control head 5 (or an audio recording/playback head & CTL head assembly) are positioned as shown in FIG. 5.

As shown in FIG. 5, the video tape 2 is divided into four intervals T1, T2, T3 and T4. In the interval T1 of the video tape 2, the existing video/Hi-fi, audio and CTL signals are recorded on the corresponding tracks. In the interval T2, the video, audio and CTL signals are all erased by the full erase head 3. In the interval T3, only a new video signal is recorded on the video track by the drum 4. In the interval T4, new CTL and audio signals are recorded on the corresponding tracks by the CTL head 5 and an audio head (not shown), together with the new video signal.

Assume that the video signal is recorded, the travelling of the video tape is stopped, the rewinding operation of the video tape is performed and the playback operation is then performed. In this case, in the intervals T2 and T3, the CTL pulse is not recorded on the control track of the video tape. Namely, these intervals T2 and T3 are the blank intervals of the CTL pulse. The blank intervals of the CTL pulse are present whenever the record-stop-rewind-playback operations are performed.

For this reason, the blank intervals (T2 and T3) of the CTL pulse appear when the recorded signal is played back from the video tape 2. As a result, since the CTL pulse cannot be detected in the blank intervals, the operation of the playback phase error detector 30B in the phase error detection section 30 in FIG. 3 becomes unstable. The unstable operation of the playback phase error detector 30B causes the capstan motor 9 to be driven at a varying phase, resulting in an unstable travelling speed V of the video tape.

As mentioned above, the unstable operation of the VCR servo system adversely affects the ability to determine the remaining amount of the video tape.

When winding the video tape, the type of which is not discriminated, and in the direct FF/REW modes directly with no playback operation, the time required in discriminating the type of the multiple speed-record (for example, treble speed) video tape is three times as much as that in the standard speed-recorded video tape because the servo system is maintained at the playback condition according to the principle of the deck mechanism. Namely, the time required in the discrimination of the type of the video tape has an affect on the FF/REW time of the video tape.

SUMMARY OF THE INVENTION

Therefore, the present invention has been made in view of the above problems, and it is an object of the present invention to provide a circuit and a method for controlling a speed and a phase of a VCR servo system in which the speed and phase of a capstan motor is controlled constantly using a CFG pulse in a blank interval of a CTL pulse when a video tape is winding, resulting in a stable tape travelling system.

In accordance with one aspect of the present invention, a circuit is provided for controlling a speed and a phase of a VCR servo system, comprising: control (CTL) signal generation means for generating a CTL signal to be recorded on a control track of a video tape, in response to a recording mode signal; speed error detection means for detecting a capstan frequency generation (CFG) signal from a capstan motor when the video tape is winding, wave-shaping the detected CFG signal into a CFG pulse in the form of a square wave and detecting a speed error from the CFG pulse as speed control data; phase error detection means having a recording phase error detector and a playback phase error detector, the recording phase error detector detecting a recording phase error from the CFG pulse from the speed error detection means in a recording mode and outputting the detected recording phase error as recording phase control data, the playback phase error detector inputting the CTL signal, which is generated from the CTL signal generation means and then recorded on the control track of the video tape, in a playback mode, wave-shaping the inputted CTL signal into a CTL pulse in the form of square wave and detecting a playback phase error from the CTL pulse as playback phase control data; speed/phase control means for controlling a speed and a phase of the capstan motor in accordance with the speed control data from the speed error detection means and the phase control data from the phase error detection means; CTL signal blank discrimination means for inputting the CTL pulse from the playback phase error detector in the phase error detection means, discriminating a blank interval of the CTL signal based on the inputted CTL pulse and outputting a discrimination signal in accordance with the discriminated result; first switching control means for inputting the discrimination signal from the CTL signal blank discrimination means, an FF/REW mode signal, the recording mode signal and a tape type discrimination signal and performing a logical operation based on the inputted signals to output a first control signal; second switching control means for inputting a video tape loading signal, the FF/REW mode signal and the tape type discrimination signal and performing a logical operation based on the inputted signals to output a second control signal; first switching means responsive to the first control signal from the first switching control means for selecting the output from the recording phase error detector in the phase error detection means in the blank interval of the CTL signal in the recording mode or the playback mode and selecting the output from the playback phase error detector in the phase error detection means in a normal playback condition; and second switching means responsive to the second control signal from the second switching control means for connecting the speed/phase control means to the ground in the FF/REW modes and upon discrimination of the type of the video tape and applying the phase control data selected by the first switching means to the speed/phase control means in the FF/REW modes and upon no discrimination of the type of the video tape or in modes other than the FF/REW modes.

In accordance with another aspect of the present invention, there is provided a method of controlling a speed and a phase of a VCR servo system having a video tape, a control (CTL) head and a capstan motor, comprising the steps of: discriminating whether the present mode is any one of playback, recording and FF/REW modes when the video tape is winding; detecting speed control data and phase control data based on a capstan frequency generation (CFG) pulse from the capstan motor in the recording mode and controlling a speed and a phase of the capstan motor constantly in accordance with the detected speed and phase control data; determining the presence of a CTL signal from the CTL head in the playback mode to determine a blank interval of the CTL signal; detecting speed control data based on the CFG pulse and phase control data based on the CTL signal when it is determined that the present interval is not the blank interval of the CTL signal and controlling the speed and phase of the capstan motor constantly in accordance with the detected speed and phase control data; detecting speed control data and phase control data based on the CFG pulse when it is determined that the present interval is the blank interval of the CTL signal and controlling the speed and phase of the capstan motor constantly in accordance with the detected speed and phase control data; and detecting only speed control data based on the CFG pulse in the FF/REW modes and upon discriminating the type of the video tape controlling the speed of the capstan motor constantly in accordance with the detected speed control data.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 6:
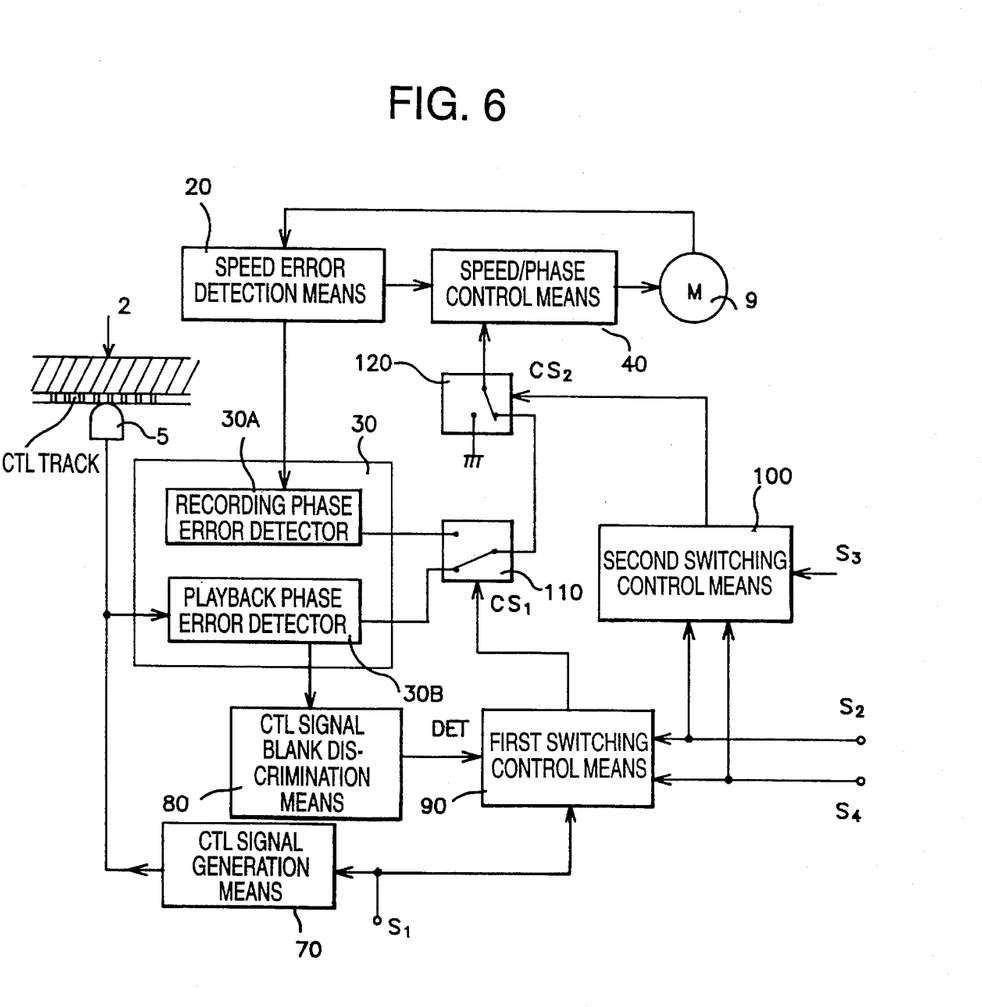
FIG. 6 is a schematic block diagram of a-circuit for controlling a speed and a phase of a VCR servo system in accordance with the present invention.

Referring to FIG. 6, a schematic block diagram of a circuit is shown for controlling a speed and a phase of a VCR servo system in accordance with the present invention. As shown in this drawing, the control circuit of the present invention comprises CTL signal generation means 70 for generating a CTL signal to be recorded on a control track of a video tape in response to a recording mode signal S1, speed error detection means 20 for detecting a CFG signal from a capstan motor 9 when the video tape is winding, wave-shaping the detected CFG signal into a CFG pulse in the form of a square wave and detecting a speed error from the CFG pulse as speed control data, and phase error detection means 30 having a recording phase error detector 30A and a playback phase error detector 30B.

The recording phase error detector 30A is adapted to detect a recording phase error from the CFG pulse from the speed error detection means 20 in a recording mode and output the detected recording phase error as recording phase control data. The playback phase error detector 30B is adapted to input the CTL signal, which is generated from the CTL signal generation means 70 and then recorded on the control track of the video tape, in a playback mode, wave-shape the inputted CTL signal into a CTL pulse in the form of a square-wave and detect a playback phase error from the CTL pulse as playback phase control data.

The control circuit of the present invention also comprises speed/phase control means 40 for controlling a speed and a phase of the capstan motor 9 in accordance with the speed control data from the speed error detection means 20 and the phase control data from the phase error detection means 30 when the video tape is wound in a normal condition or when the video tape is wound in FF/REW modes and the type thereof is not discriminated. The speed/phase control means 40 also controls the speed of the capstan motor 9 in accordance with the speed control data from the speed error detection means 20 when the video tape is wound in the FF/REW modes and the type thereof is discriminated.

The control circuit of the present invention also comprises CTL signal blank discrimination means 80, first and second switching control means 90 and 100 and first and second switching means 110 and 120.

The CTL signal blank discrimination means 80 is adapted to input the CTL pulse from the playback phase error detector 30B in the phase error detection means 30, discriminate a blank interval of the CTL signal based on the inputted CTL pulse and output a discrimination signal (DET) in accordance with the discriminated result.

The first switching control means 90 is adapted to input the discrimination signal DET from the CTL signal blank discrimination means 80, an FF/REW mode signal S2, the recording mode signal S1 and a tape type discrimination signal S4. The first switching control means 90 performs a logical operation based on the inputted signals to output a first control signal CS1.

The second switching control means 100 is adapted to loading a video tape input signal S3, the FF/REW mode signal S2 and the tape type discrimination signal S4 and perform a logical operation based on the inputted signals to output a second control signal CS2.

The first switching means 110 is operative in response to the first control signal CS1 from the first switching control means 90 to select the output from the recording phase error detector 30A in the phase error detection means 30 in the blank interval of the CTL signal in the recording mode or the playback mode and select the output from the playback phase error detector 30B in a normal playback condition.

The second switching means 120 is operative in response to the second control signal CS2 from the second switching control means 100 to apply either no phase control data selected by the first switching means 110 to the speed/phase control means 40 in the FF/REW modes and upon discrimination of the type of the video tape or apply the phase control data selected by the first switching means 110 to the speed/phase control means 40 in the FF/REW modes and upon no discrimination of the type of the video tape or in modes other than the FF/REW modes.

Figure 8:
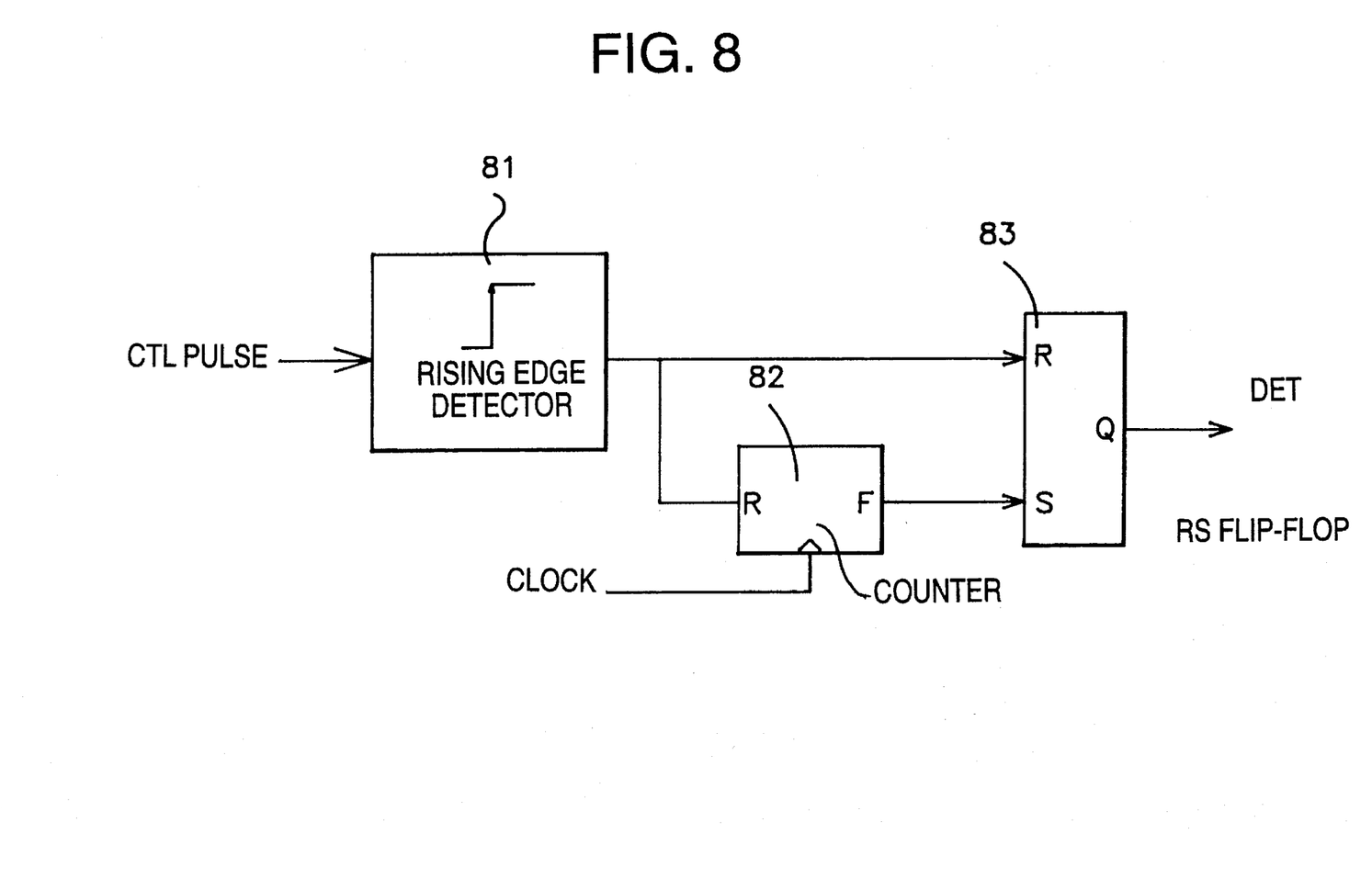
FIG. 8 is a block diagram of CTL signal blank discrimination means in accordance with an embodiment of the present invention.

Referring to FIG. 8, a block diagram of the CTL signal blank discrimination means 80 is shown in accordance with an embodiment of the present invention. As shown in this drawing, the CTL signal blank discrimination means 80 includes a rising edge detector 81 for inputting the CTL pulse from the playback phase error detector 30B in the phase error detection means 30 and detecting a rising edge of the inputted CTL pulse to output an edge detection signal, a counter 82 for inputting the edge detection signal from the rising edge detector 81 as a reset signal, inputting a clock signal at its clock terminal, counting the inputted clock signal for a predetermined period of time and outputting an overflow signal F when the predetermined time period has elapsed, and an RS flip-flop 83 for inputting the edge detection signal from the rising edge detector 81 at its reset terminal R, inputting the overflow signal F from the counter 82 at its set terminal S and detecting the blank interval of the CTL signal based on the inputted signals to output the CTL signal blank discrimination signal DET.

Figure 7:
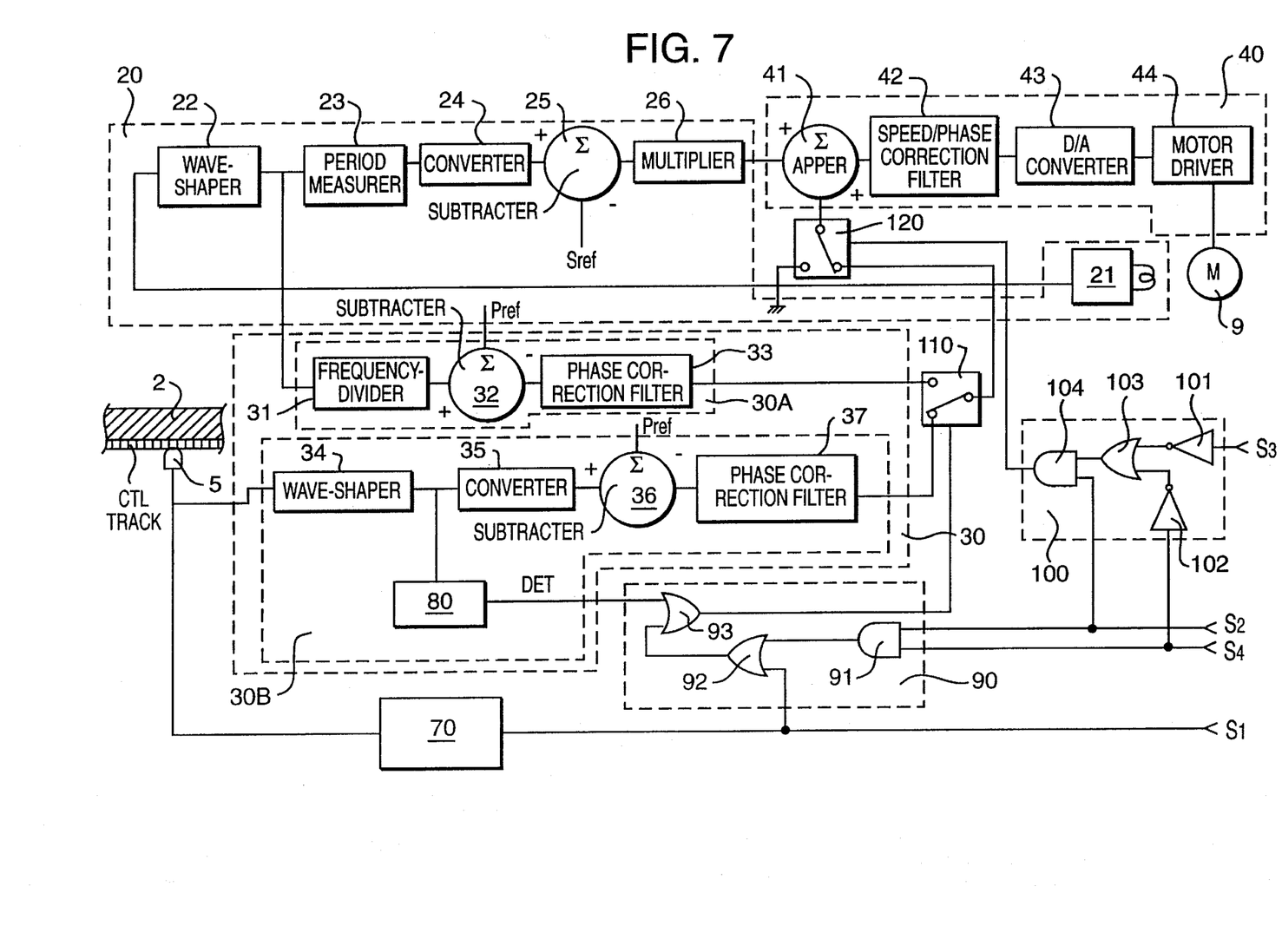
FIG. 7 is a detailed block diagram of the control circuit in FIG. 6 in accordance with the present invention.

Referring to FIG. 7, a detailed block diagram of the control circuit in FIG. 2 is shown in accordance with the present invention. As shown in this figure, the first switching control means 90 includes an AND gate 91 for inputting the FF/REW mode signal S2 at its one input terminal and the tape type discrimination signal S4 at its other input terminal and an OR gate 92 for inputting an output signal from the AND gate 91 at its one input terminal and the recording mode signal S1 at its other input terminal, and a second OR gate 93 for inputting an output signal from the OR gate 92 at its one input terminal and the CTL signal blank discrimination signal DET from the CTL signal blank discrimination means 80 at its other input terminal. As a result, the first control signal CS1 is produced from the output of the second OR gate 93.

The second switching control means 100 includes an inverter gate 101 for inverting the tape loading signal S3, a second inverter gate 102 for inverting the tape type discrimination signal S4, an OR gate 103 for inputting an output signal from the inverter gate 101 at its one input terminal and an output signal from the second inverter gate 102 at its other input terminal The second switching control means 100 also includes an AND gate 104 for inputting an output signal from the OR gate 103 at its one input terminal and the FF/REW mode signal at its other input terminal. As a result, the second control signal CS2 is produced from the output of the AND gate 104.

The detailed constructions and operations of the speed error detection means 20, the phase error detection means 30 and the speed/phase control means 40 in FIG. 7 are substantially the same as those of the speed error detection section 20, the phase error detection section 30 and the speed/phase control section 40 in FIG. 3 and a description thereof will thus be omitted.

The operation of the control circuit with the above-mentioned construction in accordance with the present invention will hereinafter be described in detail with reference to FIGS. 6 to 11.

As mentioned previously with reference to FIG. 2, the speed error detection means 20 detects the CFG signal from the capstan motor 9 when the video tape is winding and detects the speed error from the CFG signal as the speed control data.

Also, in the phase error detection means 30, the recording phase error detector 30A detects the recording phase error from the CFG signal from the speed error detection means 20 in the recording mode and outputs the detected recording phase error as the recording phase control data. The playback phase error detector 30B inputs the CTL signal, which is generated from the CTL signal generation means 70 and then recorded on the control track of the video tape, in the playback mode and detects the playback phase error from the CTL signal as the playback phase control data.

In the normal playback condition, the first switching means 110 selects the output of the playback phase error detector 30B in the phase error detection means 30 in response to the first control signal CS1 from the first switching control means 90. In this case, the second switching means 120 applies the output of the playback phase error detector 30B selected by the first switching means 110 to the speed/phase control means 40 in response to the second control signal CS2 from the second switching control means 100. The speed/phase control means 40 inputs the speed control data from the speed error detection means 20 and the playback phase control data from the playback phase error detector 30B in the phase error detection means 30 and controls the speed and phase of the capstan motor 9 constantly in accordance with the inputted data.

In the recording mode, the first switching means 110 selects the output of the recording phase error detector 30A in the phase error detection means 30 in response to the first control signal CS1 from the first switching control means 90. In this case, the second switching means 120 applies the output of the recording phase error detector 30A selected by the first switching means 110 to the speed/phase control means 40 in response to the second control signal CS2 from the second switching control means 100. The speed/phase control means 40 inputs the speed control data from the speed error detection means 20 and the recording phase control data from the recording phase error detector 30A in the phase error detection means 30 and controls the speed and phase of the capstan motor 9 constantly in accordance with the inputted data.

The details of the operation of selecting one of the outputs from the recording phase error detector 30A and the playback phase error detector 30B in the phase error detection means 30 will be described as well as applying the selected one to the speed/phase control means 40.

In the playback mode, the CTL pulse from the waveshaper 34 in the playback phase error detector 30B in the phase error detection means 30 is applied to the CTL signal blank discrimination means 80.

The CTL signal blank discrimination means 80 detects the presence of the CTL pulse to discriminate whether the present playback interval is the blank interval of the CTL pulse (as previously explained with reference to FIG. 8). As a result of the discrimination, the CTL signal blank discrimination means 80 outputs a low signal in the normal playback interval of the CTL pulse, while a high signal is output in the blank interval of the CTL pulse.

In the normal playback interval, the output signal DET from the CTL signal blank discrimination means 80 is low and this low signal is applied to the one input terminal of the secind OR gate 93 in the first switching control means 90. Since the FF/REW mode signal S2 and the recording mode signal S1 are all low in the playback mode, the output of the AND gate 91 and the output of the OR gate 92 are all low. As a result, since the low signal is applied to the other input terminal of the second OR gate 93, the first control signal CS1 becomes low.

The low control signal CS1 from the first switching means 90 causes the first switching means 110 to select the output of the playback phase error detector 30B in the phase error detection means 30.

At this time, because the FF/REW mode signal $2 is low, the second control signal CS2 from the AND gate 104 in the second switching control means 100 becomes low, thereby causing the second switching means 120 to select the output of the playback phase error detector 30B in the phase error detection means 30 selected by the first switching means 110 and then to apply the selected one to the speed/phase control means 40.

On the other hand, in the case where it is discriminated that the present playback interval is the blank interval of the CTL pulse, the output signal DET from the CTL signal blank discrimination means 80 is high and the output of the second OR gate 93 in the first switching control means 90 is thus high. As a result, the first control signal CS1 becomes high, thereby causing the first switching means 110 to select the output of the recording phase error detector 30A in the phase error detection means 30.

In this case, i.e., in the blank interval of the CTL signal in the playback mode, the phase control data from the recording phase error detector 30A based on the CFG pulse is applied to the speed/phase control means 40 through the second switching means 120. This makes it possible to control the phase error correction based on the CFG pulse even in the blank interval of the CTL signal.

Then, when the blank interval of the CTL pulse is terminated and the CTL pulse is thus normally detected, the output signal from the CTL signal blank discrimination means 80 goes low, thereby enabling the phase error correction based on the CTL pulse.

In the recording mode, since the recording mode signal S1 is high, the outputs of the OR gates 92 and 93 in the first switching control means 90 are high, thereby causing the first control signal CS1 to become high. Also, because the FF/REW mode signal S2 is low, the second control signal CS2 from the AND gate 104 in the second switching control means 100 becomes low. As a result, the output of the recording phase error detector 30A in the phase error detection means 30 is selected and then applied to the speed/phase control means 40.

On the other hand, in the case where the video tape is normally loaded, the present mode is the FF/REW modes and the type of the video tape is discriminated, the video tape loading signal S3 is high, (indicating that a video tape has been loaded in the VCR) the FF/REW mode signal S2 is high and the video tape type discrimination signal S4 is low. These signals S2, S3 and S4 are applied to the second switching control means 100.

The video tape type discrimination signal S4 is inverted by the inverter gate 102 and then applied to the OR gate 103. AS a result, the output of the OR gate is high, thereby causing the second control signal CS2 to become high. In response to the high second control signal CS2 from the second switching control means 100, the second switching means 120 is connected to the ground. As a result, no phase control data is applied to the speed/phase control means 40. Consequently, the speed/phase control means 40 performs only the speed control operation. In other words, the speed/phase control means 40 controls only the speed of the capstan motor 9 when the type of the video tape is discriminated in the FF/REW modes.

In the case where the type of the video tape is not discriminated in the FF/REW modes, the video tape type discrimination signal S4 is high and then goes low through the inverter gate 102. As a result, the outputs of the OR gate 103 and the AND gate 104 become low, thereby causing the second control signal CS2 to become low. Also, the output of the AND gate 91 in the first switching control means 90 becomes high and the first control signal CS1 thus becomes high.

In this case, the output of the recording phase error detector 30A in the phase error detection means 30 is selected and then applied to the speed/phase control means 40. Therefore, the speed/phase control means 40 performs the phase control operation in accordance with the recording phase control data from the recording phase error detector 30A.

Namely, since the speed and phase of the capstan motor 9 are controlled constantly even when there is no discrimination of the type of the video tape in the FF/REW modes, the time required in discriminating the type of the treble speed-recorded video tape is the same as that in the standard speed-recorded video tape, in the FF/REW modes.

FIGS. 9A to 9E are waveform diagrams of the signals from the components in FIG. 8 which is the block diagram of the CTL signal blank discrimination means 80 in accordance with the embodiment of the present invention. The operation of discriminating the presence of the blank of the CTL signal will hereinafter be described with reference to FIGS. 8 and 9.

Figure 9A:
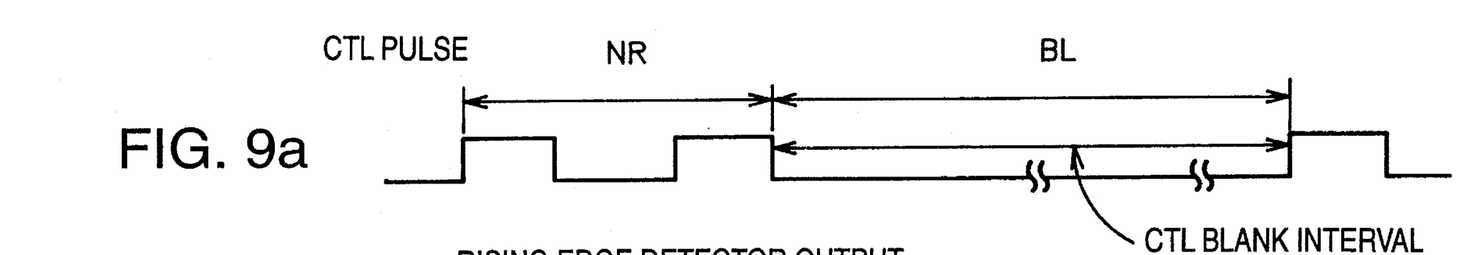
FIGS. 9A to 9E are waveform diagrams of signals from components in FIG. 8 in accordance with the present invention.
Figure 9B:
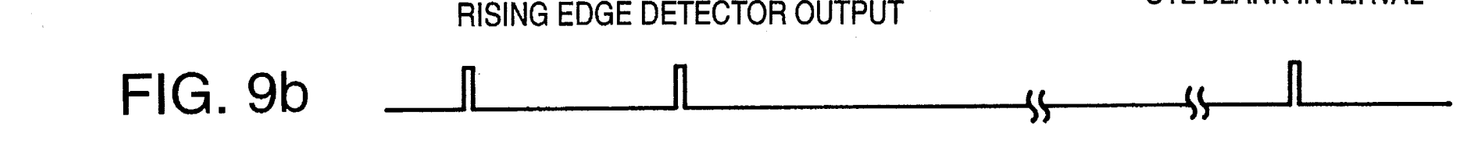

First, the CTL pulse as shown in FIG. 9A is applied from the wave-shaper 34 in the playback phase error detector 30B in the phase error detection means 30 to the rising edge detector 81. The rising edge detector 81 outputs the edge detection signal as shown in FIG. 9B by detecting the rising edge of the CTL pulse. The edge detection signal from the rising edge detector 81 is applied to the reset terminals R of the counter 82 and the RS flip-flop 83.

Figure 9C:
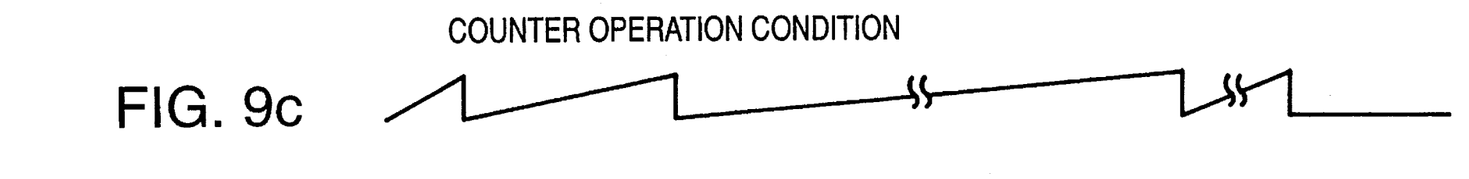
Figure 9D:
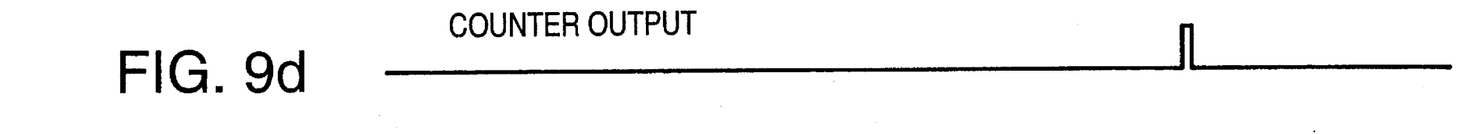
Figure 9E:
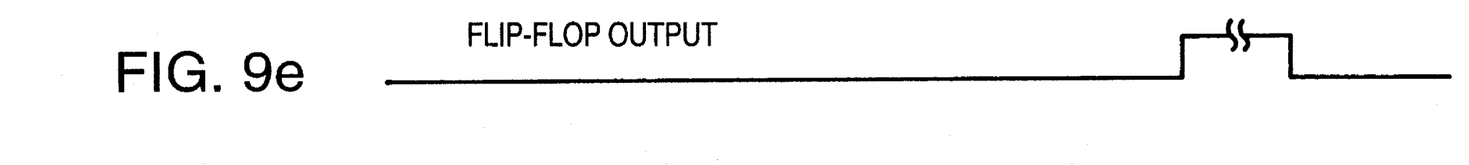

The counter 82 is reset in response to the edge detection signal from the rising edge detector 81 and counts the clock signal CLOCK applied to its clock terminal CLK. The counter 82 performs the counting operation for the predetermined period of time and then outputs the overflow signal F of high state when it has overflowed with the lapse of the predetermined time period. Also, upon inputting the edge detection signal from the rising edge detector 81 in the middle of the counting operation, the counter 82 is reset. In the normal interval NR, the counting and reset operations of the counter 82 are repeatedly performed in the unit of one period of the edge detection signal from the rising edge detector 81, as shown in FIG. 9C.

when the output signal F from the counter 82 goes low as shown in FIG. 9D, the CTL signal blank discrimination signal DET or the output Q of the flip-flop 83 becomes low as shown in FIG. 9E. The CTL signal blank discrimination signal DET of low state indicates that the CTL signal is normally reproduced.

On the other hand, in the blank interval (BL) of the CTL signal, an interval between the adjacent edge detection signals from the rising edge detector 81 is much longer than that in the normal interval NR as shown in FIG. 9B. In this case, the counter 82 is overflows and thus outputs the overflow signal F of high state as shown in FIG. 9D. The overflow signal F of high state from the counter 82 is applied to the set terminal S of the RS flip-flop 83, thereby to set the RS flip-flop 83. As a result, the CTL signal blank discrimination signal DET or the output Q of the flip-flop 83 becomes high as shown in FIG. 9E. The CTL signal blank discrimination signal DET of high state indicates that the blank interval of the CTL signal is present.

In accordance with an alternative embodiment of the present invention, a microcomputer containing a counter therein may be employed as the CTL signal blank discrimination means 80 instead of the circuit shown in FIG. 8.

Figure 10:
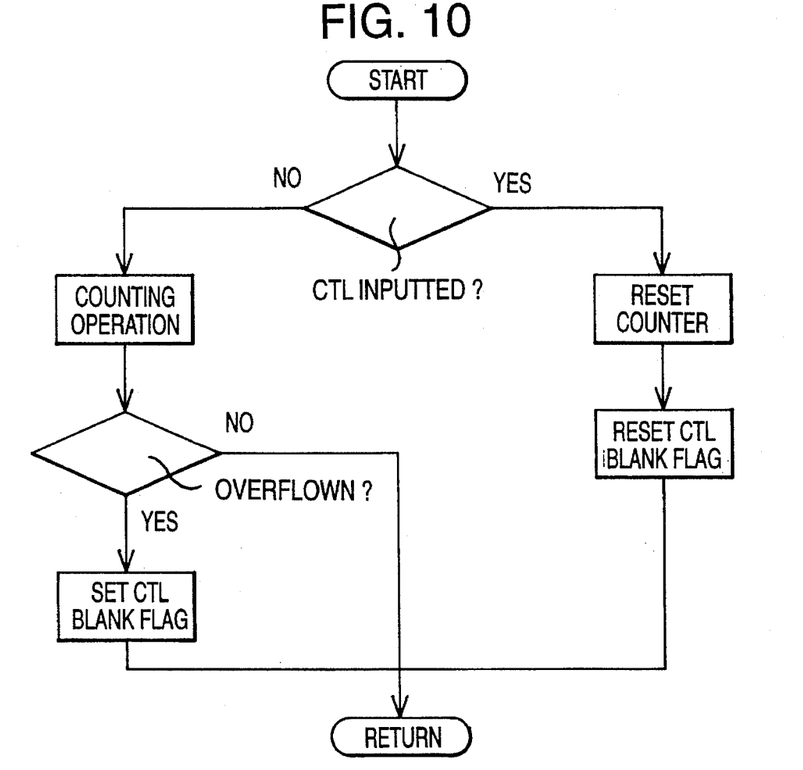
FIG. 10 is a flowchart illustrating an operation of determining a blank interval of a CTL signal in accordance with an alternative embodiment of the present invention.

FIG. 10 is a flowchart illustrating an operation of discriminating the blank of the CTL signal in accordance with the alternative embodiment of the present invention.

The operation of discriminating the blank of the CTL signal comprises a step of discriminating whether the CTL signal has been inputted, a step of resetting the counter and a CTL blank flag if the CTL signal has been inputted and then returning the operation, a step of operating the counter if the CTL signal has not been inputted and discriminating whether the counter has overflowed, a step of returning the operation if the counter has not overflowed, and a step of setting the CTL blank flag if the counter has overflowed.

When the CTL blank flag is reset, the first switching control means 90 is connected to the playback phase error detector 30B. When the CTL blank flag is set, the first switching control means 90 is connected to the recording phase error detector 30A.

Figure 11:
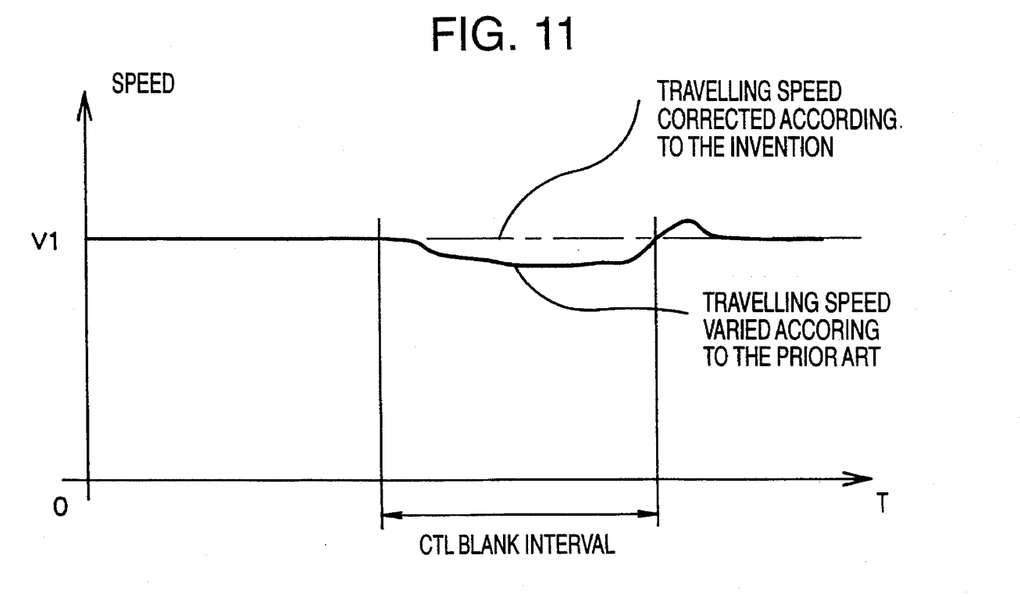
FIG. 11 is a graph illustrating a tape travelling speed in a blank interval of the CTL signal in accordance with the present invention.

FIG. 11 is a graph illustrating the tape travelling speed in the blank interval of the CTL signal in accordance with the present invention. It can be seen from this drawing that the constant speed control is performed even in the blank interval of the CTL pulse according to the present invention, as compared with the prior art.

As hereinbefore described, according to the present invention, even in the case of winding an empty video tape on which audio, video and CTL signals are not recorded at all, the constant speed control can be performed and the remaining amount of the video tape can thus be measured accurately. Also, even in the presence of the blank interval of the CTL signal in a video tape on which audio and video signals have been recorded, the constant speed control can be performed, resulting in a stable tape travelling system. Furthermore, the time required in discriminating the type of the treble speed-recorded video tape is the same as that in the standard speed-recorded video tape, in the FF/REW modes. This is an improvement in the FF/REW time of the video tape.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A circuit for controlling a speed and a phase of a VCR servo system, comprising:

control (CTL) signal generation means for generating a CTL signal to be recorded on a control track of a video tape in response to a recording mode signal;

speed error detection means for detecting a capstan frequency generation (CFG) signal from a capstan motor when the video tape is wound, converting the detected CFG signal into a CFG pulse in a form of a square wave, and detecting a speed error from the CFG pulse as speed control data;

phase error detection means having a recording phase error detector and a playback phase error detector, said recording phase error detector detecting a recording phase error from the CFG pulse from said speed error detection means in a recording mode and outputting the detected recording phase error as recording phase control data, said playback phase error detector inputting the CTL signal from the control track of the video tape in a playback mode, converting the inputted CTL signal into a CTL pulse in the form of a square wave and detecting a playback phase error from the CTL pulse as playback phase control data;

speed and phase control means for controlling a speed and a phase of the capstan motor in accordance with the speed control data from said speed error detection means and the phase control data from said phase error detection means;

CTL signal blank detection means for inputting the CTL pulse from said playback phase error detector in said phase error detection means, detecting a blank interval in the CTL signal based on the inputted CTL pulse and outputting a detection signal in accordance with the detecting of the blank interval;

first switching control means for inputting the detection signal from said CTL signal blank detection means, a fast forward or rewind (FF/REW) mode signal, the recording mode signal, and a tape type discriminating signal and performing a first logical operation based on the four inputted signals to output a first control signal;

second switching control means for inputting a video tape loading signal indicating that a video tape has been loaded in the system, the FF/REW mode signal, and the tape type discriminating signal and performing a second logical operation based on the three inputted signals to output a second control signal;

first switching means responsive to the first control signal from said first switching control means for selecting an output from said recording phase error detector in said phase error detection means in the recording mode or in the blank interval of the CTL signal in the playback mode or when the type of the video tape is not discriminated in the FF/REW modes and for selecting an output from said playback phase error detector in said phase error detection means in a recorded interval of the CTL signal in the playback mode; and second switching means responsive to the second switching control signal from said second switching control means for one of connecting said speed and phase control means to a ground terminal to prevent data from being applied to said speed and phase control means upon discriminating the type of the video tape in the FF/REW modes, applying the recording phase control data selected by said first switching means to said speed and phase control means upon not discriminating the type of the video tape in the FF/REW modes, and applying the recording phase control data or the playback phase control data according to the first switching means to said speed and phase control means in modes other than the FF/REW modes.

2. A circuit for controlling a speed and a phase of a VCR servo system according to claim 1, wherein said CTL signal blank detection means includes:

edge detecting means for inputting the CTL pulse from said playback phase error detector in said phase error detection means and detecting a rising edge of the inputted CTL pulse to output an edge detection signal;

counting means for inputting the edge detection signal from said edge detecting means as a reset signal, inputting a clock signal at a clock terminal, counting the inputted clock signal for a predetermined period of time and outputting an overflow signal when the predetermined time period has elapsed; and means for inputting the edge detection signal from said edge detecting means at one input terminal, inputting the overflow signal from said counting means at another input terminal and detecting the blank interval of the CTL signal based on the two inputted signals to output the CTL signal blank detection signal.

3. A circuit for controlling a speed and a phase of a VCR servo system according to claim 1, wherein said CTL signal blank detection means include a microcomputer having a counter.

4. A circuit for controlling a speed and a phase of a VCR servo system according to claim 1, wherein said first switching control means includes:

a first logic gate for inputting the FF/REW mode signal at one input terminal and the tape type discriminating signal at another input terminal;

a second logic gate for inputting an output signal from said first logic gate at one input terminal and the recording mode signal at another input terminal; and a third logic gate for inputting an output signal from said second logic gate at one input terminal and the CTL signal blank detection signal from said CTL signal blank detection means at another input terminal, the third logic gate outputting the first control signal.

5. A circuit for controlling a speed and a phase of a VCR servo system according to claim 1, wherein said second switching control means includes:

a first logic gate for inverting the tape loading signal;

a second logic gate for inverting the tape type discriminating signal;

a third logic gate for inputting an output signal from said first logic gate at one input terminal and an output signal from said second logic gate at another input terminal; and a fourth logic gate for inputting an output signal from said third logic gate at one input terminal and the FF/REW mode signal at another input terminal, the fourth logic gate outputting the second control signal.

6. A method of controlling a speed and a phase of a VCR servo system having a video tape, a control (CTL) head and a capstan motor, the method comprising the steps of:

discriminating whether a present mode is any one of playback, recording and fast forward or rewind (FF/REW) modes when the video tape is winding;

developing speed control data and phase control data based on a capstan frequency generation (CFG) pulse from the capstan motor in the recording mode and controlling a speed and a phase of the capstan motor constantly in accordance with the detected speed and phase control data;

discriminating a presence of a CTL signal from the CTL head in the playback mode to detect a blank interval of the CTL signal;

developing speed control data based on the CFG pulse and phase control data based on the CTL signal when a present interval is not the blank interval of the CTL signal in the playback mode and controlling the speed and phase of the capstan motor constantly in accordance with the detected speed and phase control data; and developing speed control data and phase control data based on the CFG pulse when the present interval is the blank interval of the CTL signal in the playback mode and controlling the speed and phase of the capstan motor constantly in accordance with the detected speed and phase control data.

7. A method of controlling a speed and a phase of a VCR servo system according to claim 6, wherein the CTL signal blank interval developing step includes the steps of:

determining whether the CTL signal has been inputted;

resetting a counter and a CTL blank flag when the CTL signal has been inputted and then returning to a main operation;

operating the counter when the CTL signal has not been inputted and determining whether the counter has overflowed;

returning to the main operation when the counter has not overflowed; and setting the CTL blank flag when the counter has overflowed.

8. A method of controlling a speed and a phase of a VCR servo system, as set forth in claim 6, wherein, when the discriminated mode is the fast forward or rewind (FF/REW) modes, the method further comprises the steps of:

maintaining a constant speed and phase of the capstan motor according to the speed and phase control data based on the CFG pulse when the tape type is not determined; and controlling the speed of the capstan motor according to only developed speed control data based on the CFG pulse when the tape type is determined.

* * * * *